(12) United States Patent  (10) Patent No.: US 11,247,504 B2
Herrmann  (45) Date of Patent: Feb. 15, 2022

(54) DISTRIBUTED PARALLEL PROCESSING SYSTEM FOR MAKE-ON-DEMAND BOOK MANUFACTURING

(71) Applicant: Xerox Corporation, Norwalk, CT (US)

(72) Inventor: Douglas K. Herrmann, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 188 days.

(21) Appl. No.: 16/507,921

(22) Filed: Jul. 10, 2019

(65) Prior Publication Data

US 2021/0008918 A1    Jan. 14, 2021

(51) Int. Cl.
| | |
|---|---|
| *B42C 19/02* | (2006.01) |
| *G06Q 30/06* | (2012.01) |
| *G05B 19/042* | (2006.01) |
| *G06Q 50/04* | (2012.01) |

(52) U.S. Cl.
CPC ............ *B42C 19/02* (2013.01); *G05B 19/042* (2013.01); *G06Q 30/0633* (2013.01); *G06Q 50/04* (2013.01); *G05B 2219/2646* (2013.01)

(58) Field of Classification Search
None
See application file for complete search history.

(56) References Cited

U.S. PATENT DOCUMENTS

| | | | |
|---|---|---|---|
| 6,142,721 A * | 11/2000 | Marsh ..................... | B42C 11/06 412/1 |
| 7,413,175 B2 | 8/2008 | Levine et al. | |
| 7,758,036 B2 | 7/2010 | Levine et al. | |
| 8,330,971 B2 | 12/2012 | Ruegg et al. | |
| 2005/0176336 A1 | 8/2005 | Lee et al. | |
| 2006/0028662 A1* | 2/2006 | Dobrovolsky .......... | B41F 17/02 358/1.9 |
| 2006/0176336 A1 | 8/2006 | Moore et al. | |
| 2007/0003741 A1 | 1/2007 | Sakurai et al. | |
| 2007/0008587 A1* | 1/2007 | Dobrovolsky ........... | B65H 5/04 358/296 |
| 2007/0147867 A1* | 6/2007 | Sekiya ................ | G03G 15/5004 399/75 |
| 2007/0272361 A1 | 11/2007 | Cracknell et al. | |
| 2008/0018915 A1 | 1/2008 | Moore | |
| 2008/0138170 A1 | 6/2008 | Sturnick et al. | |
| 2009/0081000 A1* | 3/2009 | Nagasawa ............. | B42C 9/0037 412/4 |

(Continued)

*Primary Examiner* — Charles E Anya

(74) *Attorney, Agent, or Firm* — Fay Sharpe, LLP

(57) ABSTRACT

A bookmaking system includes sets of redundant cover printers and book block printers and a binder (or set of binders) for binding a printed cover page, printed by an assigned one of the set of redundant cover printers, and a corresponding set of printed pages for a book block, printed by an assigned one of the set of redundant book block printers, together to form a book. A transport mechanism connects the redundant printers and redundant cover printers with the binder. An assigned one of a plurality of book block buffers, intermediate the book block printers and the binders, stores the set of printed pages until the corresponding printed cover page is ready for binding; and/or an assigned one of a plurality of cover buffers, intermediate the cover printers and the binders, stores the printed cover page until binding can be performed.

19 Claims, 9 Drawing Sheets

(56) References Cited

U.S. PATENT DOCUMENTS

| | | |
|---|---|---|
| 2010/0053641 A1 | 3/2010 | Lofthus et al. |
| 2010/0238505 A1 | 9/2010 | Lofthus et al. |
| 2012/0193860 A1 | 8/2012 | Lewalski et al. |
| 2012/0320407 A1* | 12/2012 | Hoarau ................ G06F 3/1211 358/1.15 |
| 2013/0230367 A1* | 9/2013 | Wiegand ............... G06F 3/1285 412/4 |
| 2013/0236269 A1* | 9/2013 | Watanabe .......... G03G 15/6544 412/11 |
| 2013/0258375 A1 | 10/2013 | Morgana et al. |
| 2014/0025363 A1 | 1/2014 | Zou et al. |
| 2014/0241849 A1 | 8/2014 | Herrmann et al. |
| 2016/0103415 A1 | 4/2016 | Bryl et al. |
| 2017/0068494 A1* | 3/2017 | Fukuda ................ G06F 3/1205 |
| 2017/0151820 A1* | 6/2017 | Matsumine ............ B41J 11/485 |
| 2017/0217226 A1 | 8/2017 | Bigott et al. |

\* cited by examiner

DISTRIBUTED PARALLEL PROCESSING SYSTEM FOR MAKE-ON-DEMAND BOOK MANUFACTURING

BACKGROUND

The exemplary embodiment relates to document printing and finds particular application in a system and method for make-on-demand book publishing.

Books are conventionally published in large quantities in a single printing. In such an inventory-based system, the published books are stored in warehouses or by booksellers until purchased by customers. If too many books are printed to meet demand, they may be returned to the publisher for recycling. Publishers may decline to print books for which there is little perceived demand. As a result, publishers may suffer lost revenue, both in excess production and lost opportunities. Additionally, book purchasers are unable to obtain copies of out-of-print books or on specialized topics.

Recently, there has been an interest in on-demand manufacturing for single copies or a few copies of a book. This allows books to be printed as needed, to meet customer demands. On-demand manufacturing generally entails printing an entire book, including the cover, assembling and binding the various parts, and shipping the book(s) to a customer, all within a short time period. Printing systems designed for large print runs are often unsuited to this task. For example, book pages may be printed N-up (multiple copies on the same large sheet), requiring cutting and page ordering, which is time-consuming for a single book. Scheduling for printing of different books may be difficult when each has a different number of pages, different printing requirements, a different format, and so forth.

There remains a need for a printing system and method which are capable of printing short runs of multiple different books in an efficient manner.

INCORPORATION BY REFERENCE

The following references, the disclosures of which are incorporated herein by reference, in their entireties, are mentioned:

Parallel printing systems are described, for example, in U.S. Pub. Nos 20060176336, 20080018915, 20100053641, 20100238505, and 20130258375.

Cover printing systems are described, for example, in U.S. Pat. Nos. 7,413,175; 7,758,036; and 8,330,971.

Laminators are described, for example, in U.S. Pub. Nos 20070003741, 20080138170, and 2014025363.

Stack handling systems are described, for example, in U.S. Pub. Nos. 20120193860, 20140241849 and 20160103415.

Bookmaking systems are described, for example, in U.S. Pub. Nos. 20070272361, 20080138170, 20120193860, and 20170217226.

BRIEF DESCRIPTION

In accordance with one aspect of the exemplary embodiment, a bookmaking system includes a set of redundant cover printers, each of redundant cover printers in the set being configured print a cover page for a book. The system also includes a set of redundant book block printers, each of the redundant printers in the set being configured for printing a corresponding set of pages for a book block of each book. A binder binds a printed cover page, printed by any one of the set of redundant cover printers, and a corresponding set of printed pages for a book block, printed by any one of the set of redundant book block printers, together to form a book. A transport mechanism connects each of the set of redundant printers and each of the set of redundant cover printers with the binder. A plurality of book block buffers, intermediate the book block printers and the binders, store the set of printed pages for each book block until the corresponding printed cover page is ready for binding and/or a plurality of cover buffers, intermediate the cover printers and the binders, store each printed cover page until the corresponding set of printed pages for the book block are ready for binding.

In accordance with another aspect of the exemplary embodiment, a bookmaking method includes receiving an order for at least one book and for each book in the order, assigning printing of a cover of the book to an available one of a set of redundant cover printers; assigning printing of pages for a book block of the book to an available one of a set of redundant book block printers, printing the set of pages to form the book block of the book on the available one of the set of redundant book block printers, and printing the cover of the book on the available one of the set of redundant cover printers, without reference to whether the set of pages to form the book block have been printed. The printed cover page is transported to an available one of a set of redundant laminators and laminated with the available one of the set of redundant laminators. At least one of the laminated printed cover page and the set of printed pages for the book block is stored in a respective storage buffer of a set of redundant storage buffers. When the laminated printed cover page and the printed pages for the book block are ready for binding and one of a set of redundant binders is available for binding, the stored at least one of the laminated printed cover page and the set of printed pages is retrieved from the respective storage buffer. The laminated printed cover page and the set of printed pages for the book block are bound together to form a book.

In accordance with another aspect of the exemplary embodiment, a control unit for a bookmaking system includes an order reception component which receives an order for at least one book to be printed. An order processing component identifies book block pages and a cover page for each book in the order. A router assigns the book block pages for each book to a respective one of a set of redundant book block printers, assigns the cover page for each book to a respective one of a set of cover printers, and assigns storage buffers to the printed book blocks and cover pages from respective sets of redundant book block and cover page storage buffers, which store printed book block pages and cover pages until a binder is available for binding. A tracking component tracks the locations of printed book block pages and cover pages. A processor implements the order reception component, order processing component, router and tracking component.

DETAILED DESCRIPTION

Figure 1:
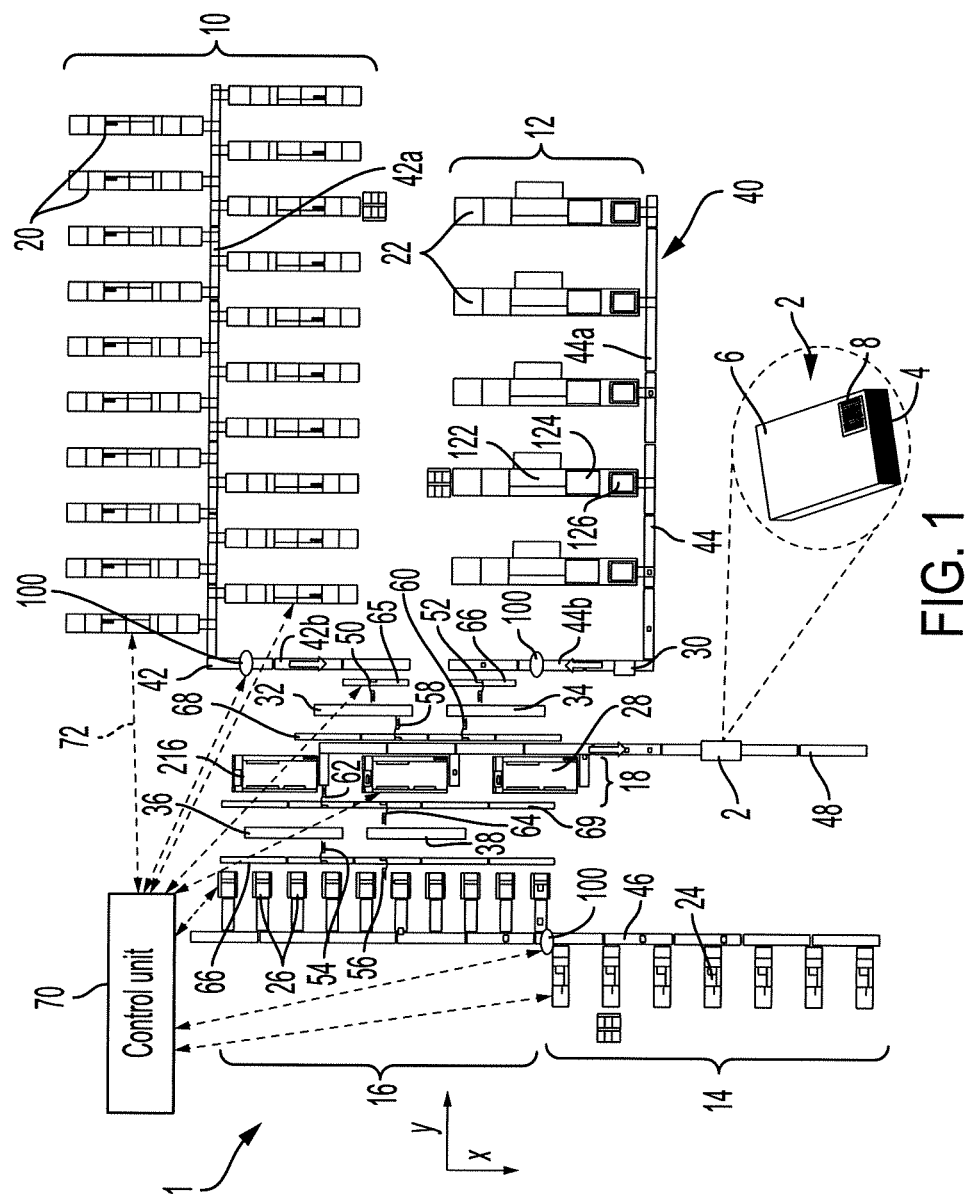
FIG. 1 is a functional block diagram of a system for executing orders for books in accordance with one aspect of the exemplary embodiment.

Aspects of the exemplary embodiment relate to a printing and assembly system composed of multiple printers that is capable of producing limited numbers of multiple different books contemporaneously and to a method of printing. The system and method are suited to print-on-demand book manufacture, allowing books to be printed and shipped within a few hours of an order being placed, in a cost-effective manner. As large numbers of books are now purchased online, publishers can move away from an inventory-based model, while customers are able to obtain unique or specialized books at short delivery times.

The exemplary system employs multiple parallel printers, storage buffers, and finishers to print either a single book or multiple single books without the need to batch for multiple-up slitting or cutting. This eliminates the need to have cutting systems in-line with each of the multiple printers. The exemplary system allows for redundancy by allowing each of the printers to feed to each of the downstream finishing systems. This redundancy maximizes throughput while minimizing hardware requirements.

The method and system find application in Book of One or Make-On-Demand book factories, particularly those aiming to provide shortened delivery times, such as 2-day or 1-day deliveries to customers placing orders online.

A "book" is used herein to mean a physical document which is formed from multiple printed pages that have been assembled, e.g., by binding, into a unitary body. Pages of the book may include photographic images, graphics, and/or text.

As used herein, a "printer" can include any device for rendering an image on print media, such as a laser printer, inkjet printer, or a multifunction machine, which also provides one or more additional functions, such as scanning. The operation of applying images to print media, for example, graphics, text, photographs, etc., is generally referred to herein as printing or marking.

A "finisher" can be any post-printing device used in formation of a book from printed pages, such as a laminator, binder, combination thereof, or the like.

Printers, finishers and other hardware components used in bookmaking may be collectively referred to as "devices."

"Print media" can be a physical sheet of paper, card, plastic, or other suitable physical print media substrate for images.

An "image" generally may include information in electronic form which is to be rendered on the print media by a printer and may include text, graphics, photographic images, and the like.

A "print job" is normally a set of related sheets, usually one or more collated copy sets copied from a set of original print job sheets or electronic document page images, that are intended to form a book.

By "redundant" it is meant that two or more devices are configured to perform the same task (e.g., color printing, monochrome printing, cover printing, storing, laminating, or binding), such that part of the bookmaking process can be assigned to any one of the redundant devices configured for performing that part. In general, there are sufficient of each type of redundant device that multiple books can be in production concurrently.

With reference to FIG. 1, an exemplary printing and assembly system 1 for printing and assembling a book 2, or more generally, multiple books, is illustrated. Each book includes a printed book block (main body) 4 and a printed outer cover 6, optionally, incorporating a machine-readable identifier 8.

The exemplary printing system 1 includes multiple independently-controllable printers, such as one or more sets 10, 12 of book block printers and a set 14 of book cover printers. The book block printers print the book block 4 of each book 2, e.g., on lighter-weight print media, while the book cover printers print the book covers 6, e.g., on heavier-weight print media. A set 16 of laminators each receive printed covers and laminate them, e.g., with a film or coating. A set 18 of binders each receive printed book block pages and laminated cover pages and assemble them into a book 2. The laminators and binders may be collectively referred to herein as finishers. As will be appreciated, the finishers in the printing system are not limited to laminators and binders.

In the illustrated printing system 1, the first set 10 of printers includes multiple (e.g., at least 3, or at least 5, or at least 10, such as 20) redundant monochrome (black and white) printers 20. Some or all of the monochrome printers 20 may be nominally identical in the sense that pages of a book block to be printed in monochrome can be assigned to any one or more of the monochrome printers 20, such that the printed pages are indistinguishable. The second set 12 of printers includes multiple (e.g., at least 2, or at least 3, or at least 5) color printers 22 (e.g., printers which print in at least 3 or at least 4 colors, such as cyan, magenta, and yellow (CMY) and optionally black (K), which is a preformed mixture of CMY colorants). Some or all of the color printers 22 may be nominally identical in the sense that pages of a book block to be printed in color can be assigned to any one or more of the color printers 22. In some embodiments, books may include only monochrome, only color, or both color and monochrome book block pages. In some embodiments, the entire book block is printed on one or more of the color printers if at least some portion is in color, otherwise, the entire book block is printed on one or more of the monochrome printers. In some embodiments, one or more portions of a book block is/are printed on one or more of the color printers and one or more portions of that book block is/are printed one or more of the monochrome printers. In some embodiments, either the monochrome or color printers may be omitted. The printers in each set 10, 12 are arranged in parallel and have their input and output ends aligned in the x direction.

The set 14 of cover printers includes multiple (e.g., at least 2, or at least 5, such as 7) redundant color cover printers 24 (e.g., printing in 3, 4, or more colors), which are configured for printing book covers. Some or all of the cover printers 24 may be nominally identical in the sense that cover pages for a book to be printed can be assigned to any one of the cover printers 24. In some embodiments, the cover printers 24 may be nominally identical to the color printers 22. The cover printers generally employ larger sheets of print media than the book block printers, since each printed cover page covers the front side, back side, and bound end of the respective book block (allowing for any trimming which is to be performed). The printers in the set 14 are arranged in parallel and have their input and output ends aligned in the same (y) direction, although other arrangements are contemplated.

The set 16 of laminators includes multiple laminators 26 (e.g., at least 2, or at least 5, such as 10 laminators) and the set 18 of binders includes multiple redundant binders 28 (e.g., at least 2, or at least 3 binders). The laminators 26 receive printed cover pages 6 from the cover printers 24 for lamination, when specified. Different types of laminators may be provided, e.g., for matte and glossy lamination and/or different sized sheets, some or all of the types may be redundant. The laminators in the set 16 are arranged in parallel and have their input and output ends aligned in the same (y) direction, although other arrangements are contemplated.

The binders 28 are configured to receive an optionally-laminated cover page 6 and a stack 30 of printed sheets to constitute the book block pages 4 and assembles them into a book 2. Some or all of the laminators/binders 26, 28 may be nominally identical in the sense that printed pages and covers of books can be assigned to any one of the laminators/binders 24 for lamination/assembly.

In one embodiment, each binder 28 may include components for binding the book, such as adhering unit which applies an adhesive to the binding side of a stack 30 of printed pages that is to form the book block 4, folds the cover page 6 around the stack, and clamps the assembly (book block and cover) while the adhesive cures, and optionally a trimming unit for trimming one or more of the three exposed edges of the assembly to the selected size of the book. In the exemplary embodiment, the book block pages are not folded after printing, which reduces the time required for binding the sheets into a book. The binders in the set 18 may be arranged in a row, generally parallel with the y direction.

Sets 32, 34, 36, 38 of redundant storage buffers (four sets in the illustrated embodiment), intermediate the respective printers 20, 24 and the binders 28, are used to store printed sheets and optionally-laminated cover pages until the component parts 6, 30 of a book are ready for binding and one of the binders 28 is available to perform the binding. Each set of storage buffers includes a plurality of redundant, substantially identical storage buffers, such as at least 5 or at least 10, or at least 20 storage buffers, or more. The sets of storage buffers may each extend in the same (x) direction, running generally parallel with each other. The buffers can each store their respective contents for an unlimited time and there may be a number of buffers that are occupied by component parts 6, 30 of a respective book at any one time, which are awaiting an available binder or for the other component of the book to be ready for binding.

In some embodiments, either the cover buffers 36, 38 or the book block buffers 32, 34 may be omitted. In some embodiments, storage buffers are configured and located to accept both cover pages and book block pages, in which case, one or more of the sets of buffers 36, 38, 32, 34 may be omitted.

A transport mechanism 40 conveys printed pages for the book block 4 and printed covers 6 downstream to finishers 26, 28, and carries the finished book 2 out of the system. The transport mechanism 40 includes a combination of transport paths 42, 44, 46, 48 and an automated robotic sort and retrieval system including a plurality of robots 50, 52, 54, 56, 58, 60, 62, 64 for transferring the pages downstream. Each of the transport paths 42, 44, 46, 48 includes horizontal transport members, such as conveyor belts, rollers, vacuum transport members, combinations thereof, or the like.

Each of the robots 50, 52, 54, 56, 58, 60, 62, 64 is adapted for transferring printed book block pages, cover pages, or laminated cover pages, singly or in the form of a stack, from an adjacent transport path or laminator to a selected one of an adjacent set of storage buffers, or from a selected one of an adjacent set of storage buffers to any one of the binders 28.

The illustrated transport mechanism 40 includes a first transport path 42, which conveys printed monochrome pages, generally in a stack 30, or in some cases singly, from the first set 10 of printers to a first transfer point at or near the end of the first transport path. A first robot 50, adjacent the transfer point, transfers the stack 30 from the first transport path to one of a first set 32 of storage buffers. A second transport path 44 conveys printed color pages, in a stack 30 or singly, from the second set 12 of printers to a second transfer point at or near the end of the second transport path. A second robot 52 transfers the stack 30 from the second transport path 44 to a selected one of a second set 34 of storage buffers. The illustrated first and second transport paths 42, 44 each include a first portion 42a, 44a, which runs horizontally in a y direction, perpendicular to the x direction, and a second portion 42b, 44b, downstream of the first portion, which runs horizontally in the x direction. The first portion 42a, 44a of the transport paths 46, 48 run generally parallel with each other. At their downstream ends, the second portions 42b, 44b are positioned adjacent the robots 50 and 52, respectively. In the illustrated embodiment, paths 42, 44 are not interconnected, although other configurations are contemplated. For example, paths 42, 44 could feed into a common path (not shown). A single robot could be used to transfer stacks from the common path.

A third transport path 46, conveys printed cover pages, singly or in stacks, from the third set 14 of printers to the laminators 26. A third or fourth robot 54, 56 conveys each laminated cover page to a selected one of a third or fourth set 36, 38 of storage buffers. The book block pages and cover page for forming a book are conveyed, from their respective storage buffers, to a selected one of the binders 28 by respective fifth or sixth, and seventh or eighth robots 58, 60, 62, 64. A fourth transport path (or paths) 48 conveys the assembled books from the binders 28, out of the system, optionally to an automated packaging and labeling system (not shown). Mechanisms exist for transferring sheets/stacks/books from one part of a path to another part, which travels in a different direction, e.g., at right angles, and for merging/separating streams of sheets/stacks/books. Examples of such mechanisms are described, for example, in U.S. Pat. No. 7,934,825 and U.S. Pub. No. 2012/0193860, and references cited therein.

The exemplary robots 50, 52, 54, 56, 58, 60, 62, 64 are 7-axis robots, having up/down, forward/back, sideways, and optionally rotational movement, as well as being movable sideways along a respective horizontal track 65, 66, 68, 69. Each robot's end effector may be configured according to whether the robot is to convey a stack of pages or a single cover page. Additionally, different robots 54, 56 may be associated with different types of laminators, to cope with different properties of the laminated sheets (e.g., weight, flexibility, slipperiness, or the like).

As will be appreciated, in other configurations, the system 1 may include different numbers of transport paths, sets of storage buffers, and robots. For example, a single robot may replace robots 54, 56 and/or a single set of cover buffers may replace the two sets 36, 38. In some embodiments, some or all of the transfers to/from the buffers performed by the illustrated robots may alternatively be performed manually.

Figure 2:
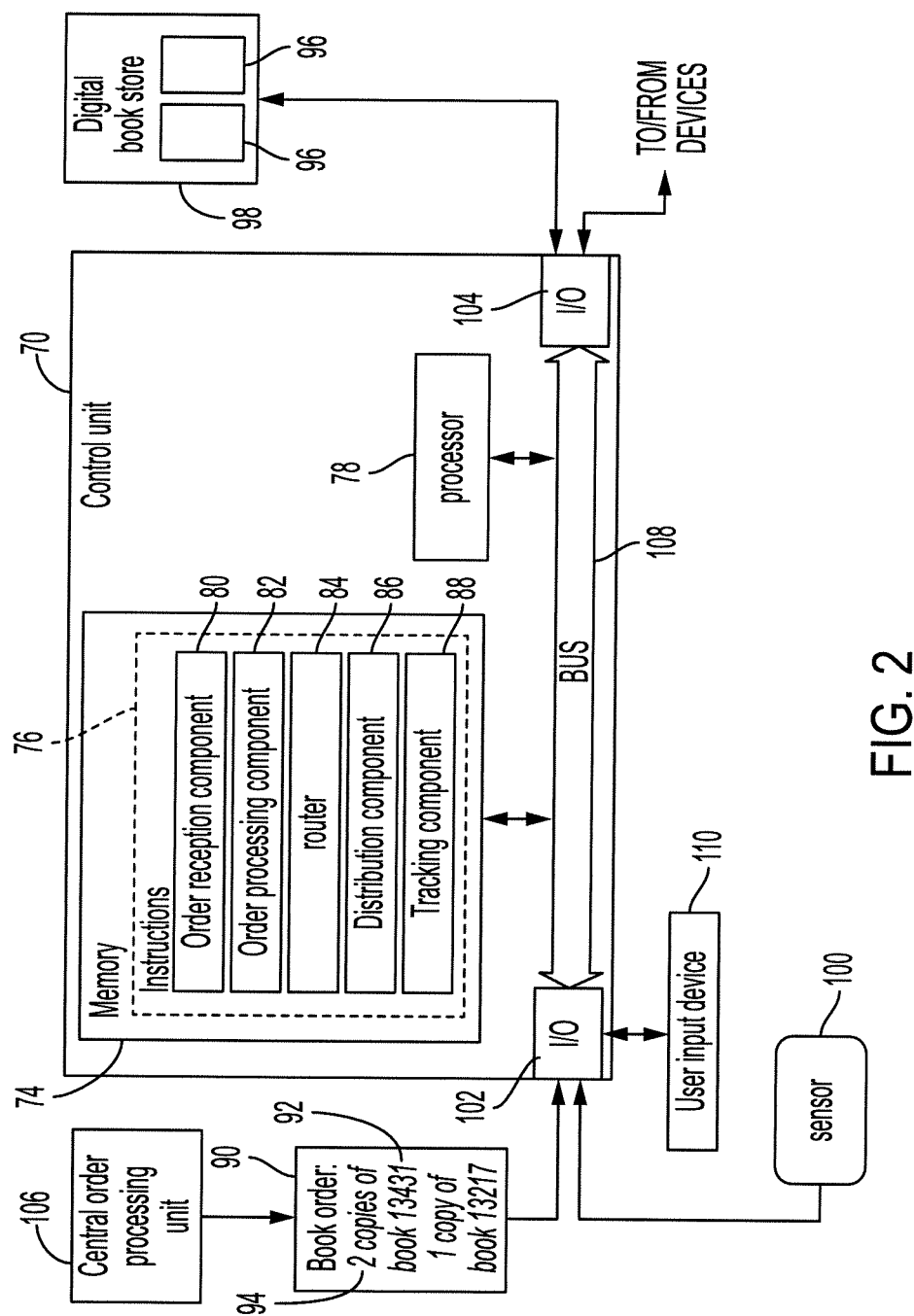
FIG. 2 is a functional block diagram of a controller for the system of FIG. 1.

A control unit 70 is communicatively connected with the other components of the system 1 by wired or wireless links 72. As illustrated in FIG. 2, the control unit 70 includes memory 74, which stores software instructions 76 for implementing at least a part of the exemplary method, and a processor 78, in communication with the memory, for executing the instructions. The illustrated instructions 76 include an order reception component 80, an order processing component 82, a router 84, a distribution component 86, and a tracking component 88.

The order reception component 80 receives orders 90 for production of books, each of which may be temporally stored in memory 74. Each order 90 may include an identifier 92 for each book to be printed and a number 94 of copies to be made of each book. The identifier 92 uniquely identifies the book to be printed. The identifier 92 may be an alphanumeric code (e.g., an ISBN number) or a description of the book (e.g., Moby Dick, 8th printing), combination thereof, or the like. The number 94 specifies the number of identical copies of that book which are to be manufactured.

Based on the identifier 92, the order processing component 82 retrieves specifications 96 for each book in the order to be produced. Each specification 96 may include details on the type of print media to be used for the book block pages and cover, identify which type(s) of printer to be used for printing the book block pages, the digital images to be printed, the type of lamination and binding to be employed, and the like. The digital images may be in PDF or other suitable format, which may be processed by the control unit 70 to place them in a suitable form for printing or they may be provided to the control unit 70 in a print ready format. Specifications 96 for each of a collection of books may be stored in local memory 74 or remote memory 98, accessible to the system 1. In other embodiments, the book specifications 96 may be incorporated in the order 90 and the identifier 96 may be omitted. The processing component 86 may incorporate matching machine-readable identification marks 8 (e.g., a one or two-dimensional barcode, OCR readable text, image or the like) within each imposed image for the cover and within one or more pages of the book block so that the parts of the book can be tracked and correctly matched together.

The router 84 identifies which of the redundant sets of printers, laminators and binders are configured and available for performing respective parts of the make-on-demand process for completing the book(s) identified in each order 90. This may include communicating with the various devices to identifying one or more printers, robots, a laminator, and a binder, that are available to perform the parts of the order which can be assigned to them. Devices that are non-operational, e.g., because a component is not functioning, the device is switched off, or the device is lacking consumables that will be needed, such as print media and colorants, such as inks or toners, in the case of the printers, or lamination/binding supplies in the case of the laminators and binders, may be identified, so that parts of the process are not assigned to them.

In the exemplary embodiment, the router 84 assigns printing of book body pages and covers on-the-fly, to the next available printer(s), without requiring any particular printing sequence. Laminators and binders are similarly assigned on-the-fly, when the respective prior step is completed. The router 84 may assign specific storage buffers to respective parts of the book (monochrome pages, color pages, laminated cover pages), allowing the book bodies and covers to be generated in any convenient order and stored until all parts are ready for one or multiple copies of the book to be bound when a suitable binder is available. The cover could thus be printed (and laminated) prior to the book block, or parts thereof. Similarly, multiple books and orders can be in progress in the system at any one time. In some embodiments, the router 84 waits until a first step is completed before assigning a device for performing the next step that is dependent on the first step. For example, the router may wait to assign a laminator until the cover page to be laminated has been printed or is sufficiently close to being printed that it can be transferred directly from the selected cover printer to an available laminator. In other embodiments, the router 84 may schedule the sequence and timing of operations to be performed (printing, lamination, and binding) and the devices to be used for each book/each order to optimize a production measure. To optimize one or more production measures, multiple books and/or orders 90 may be executed contemporaneously and/or a set of pages to be printed for one book may be split among two or more nominally-identical printers. The production measure(s) to be optimized may include maximizing the book/order throughput of the system and/or minimizing a measure of the time taken to output books/orders.

The distribution component 86 sends the page images to the assigned printers in a suitable form for rendering on print media.

The tracking component 88 keeps track of the various parts of the books as they move through the system. For example, sensors 100, positioned adjacent the transport paths 42, 44, 46, etc. (FIG. 1), and/or elsewhere in the system, identify the cover pages and book block stacks, e.g., based on their respective identifiers 8, and report their locations to the tracking component 88. Robots retrieving book blocks and covers from the buffers may include similar sensors for checking the book block/cover identifiers, facilitate sorting/buffering and retrieval.

The tracking component 88 alerts the router 84 when the parts of the book have reached or are about to reach a next destination, enabling the router to assign the next stage in the book manufacture. The tracking component 88 may also determine if a part of the book has gone missing, based on the information provided by the sensors. The tracking component 88 may then cause a visual and/or auditory alarm to be emitted to alert a human operator that there is a problem.

The control unit may control the overall operation of the various devices in the system, such as printers, robots, laminators, and binders, and/or be in communication with the devices to identify which are currently available and when an assigned task has been completed.

The control unit 70 may include one or more input/output (I/O) devices 102, 104, which allow the control unit to communicate with external devices, such as a source 106 of the book order 90 and other components of the system, such as printers, laminators, transport mechanism/members, robots, binders, and so forth. Hardware components 74, 78, 102, 104 of the control unit may be communicatively connected by a data/control bus 108. A user input device 110, such as a computer monitor, keyboard, keypad, touch screen, cursor control device, or combination thereof, may be communicatively connected with the control unit 70 to allow a human operator to take control of the system, e.g., in the case of a malfunction that is not automatically correctable, to set various parameters of the system, such as printer speeds, to input properties of newly-added components, and the like.

In one embodiment, the orders 90 are provided by a central order processing unit 106, in communication with the system 1. The central order processing unit 106 assigns orders to one or more of a set of systems 1. Each of the multiple systems 1 may be located in a respective, different location around a city, state, country, and/or continent for ease of transport of the printed books to the intended recipients. For example, the central order processing unit 106 receives orders from customers and assigns them to the system(s) closest to the recipient's (or recipients') location(s), or based on other criteria, such as whether the order includes items other than books or whether a closer one of the systems is backlogged. The central order processing unit 106 may be similarly configured to control unit 70, i.e., with memory and a processor.

The control unit 70 may include one or more computing devices, such as a PC, such as a desktop, a laptop, palmtop computer, portable digital assistant (PDA), server computer, tablet computer, dedicated computing device, combination thereof, or other computing device capable of executing instructions for performing the exemplary method.

The memory 74 may represent any type of non-transitory computer readable medium such as random access memory (RAM), read only memory (ROM), magnetic disk or tape, optical disk, flash memory, or holographic memory. In one embodiment, the memory comprises a combination of random access memory and read only memory. Memory 74 stores instructions for performing the exemplary method as well as for controlling other operations of the printing system 1 that are not described herein.

The network interface 102 allows the control unit 70 to communicate with other devices via a computer network, such as a local area network (LAN) or wide area network (WAN), or the internet, and may comprise a modulator/demodulator (MODEM) a router, a cable, and/or Ethernet port.

The digital processor device 78 can be variously embodied, such as by a single core processor, a dual core processor (or more generally by a multiple core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so called "firmware" that is software stored on a ROM or the like. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The exemplary system 1 is modular, allowing components to be added, replaced, or removed. For example, additional printers, laminators, and/or binders may be added to the system 1, removed from the system, or existing ones replaced, to meet increased/decreased production demands and/or to provide different functionalities. The software 76 of the control unit 70 is updated, as needed, to make use of the new components in the book manufacturing process.

Figure 3:
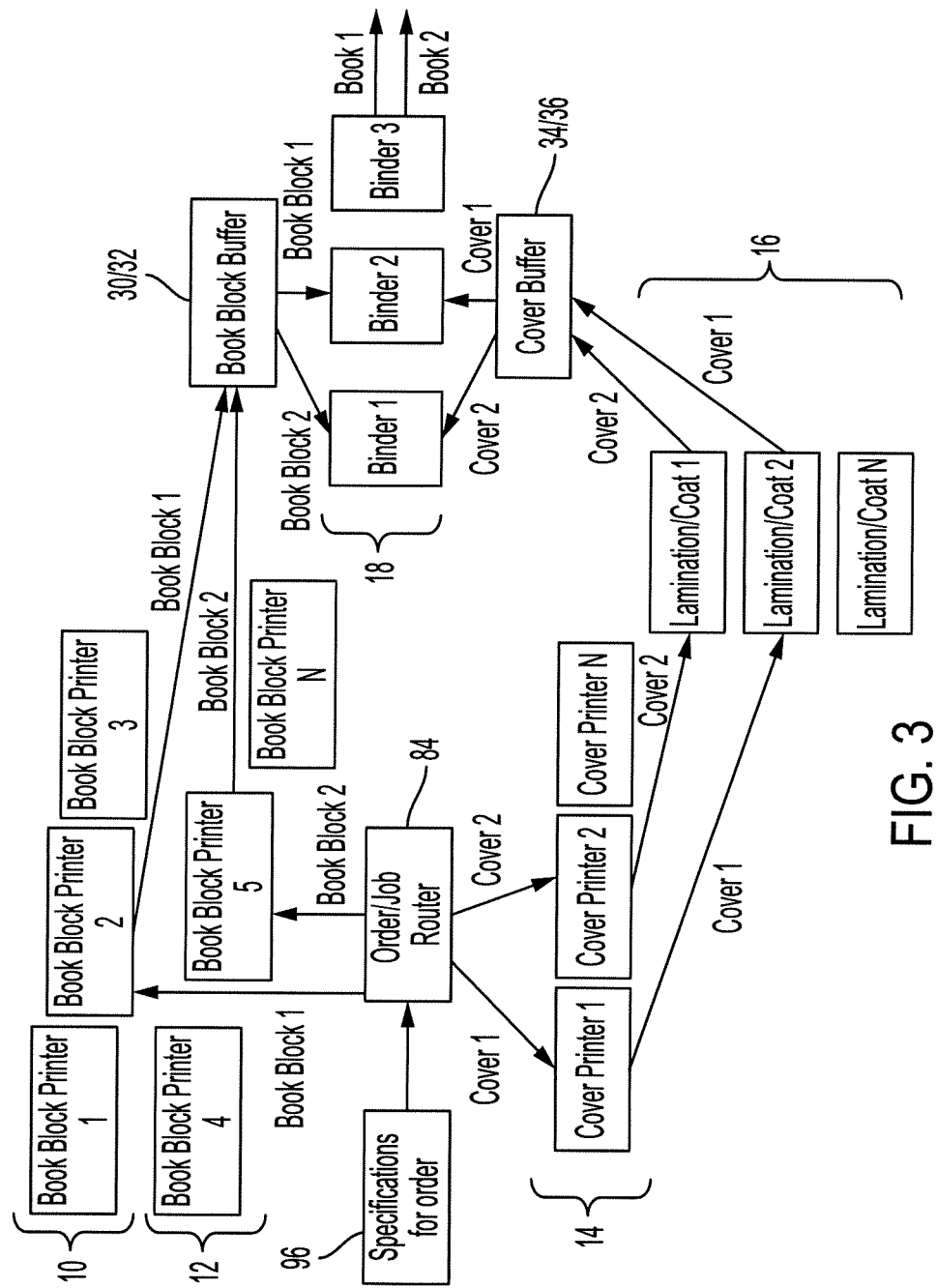
FIG. 3 is a flow diagram illustrating on-the-fly decision making during execution of a book order.

With reference to FIG. 3, an example flowpath for a book order 90 is illustrated, by way of example. Specifications 96 for two books 1 and 2 to be manufactured are received by the router 84, which assigns the book block of book 1 to book block printer 2, the book block of book 2 to book block printer 5, the cover of book 1 to cover printer 1, the cover of book 2 to cover printer 2, by way of example. When each printer has performed its respective task, the router assigns a next device. For example, as soon as cover printer 2 has printed the cover of book 2, the cover is assigned to available laminator 1 that is capable of performing the type of lamination specified. Once lamination is complete, an available cover buffer in the set 34 or 36 of cover buffers may be assigned to the laminated cover. Similarly, printed book block pages for book 1, may be completed after the cover and before those for book 2, and assigned to an available book block buffer in the set 30 or 32. The book block for book 1 remains in the assigned buffer until the cover for book 1 has been printed, laminated and received in an available cover buffer. Once the parts of the book have all been received in their respective buffers, and the router has been notified, the router assigns available binder 2 from the set 18 of binders to perform the binding for book 1. The two books are output from binders 1 and 2, to be packaged and shipped to the designated recipient(s) of the order and/or incorporated in a larger order which may include items other than the manufactured books.

Figure 4:
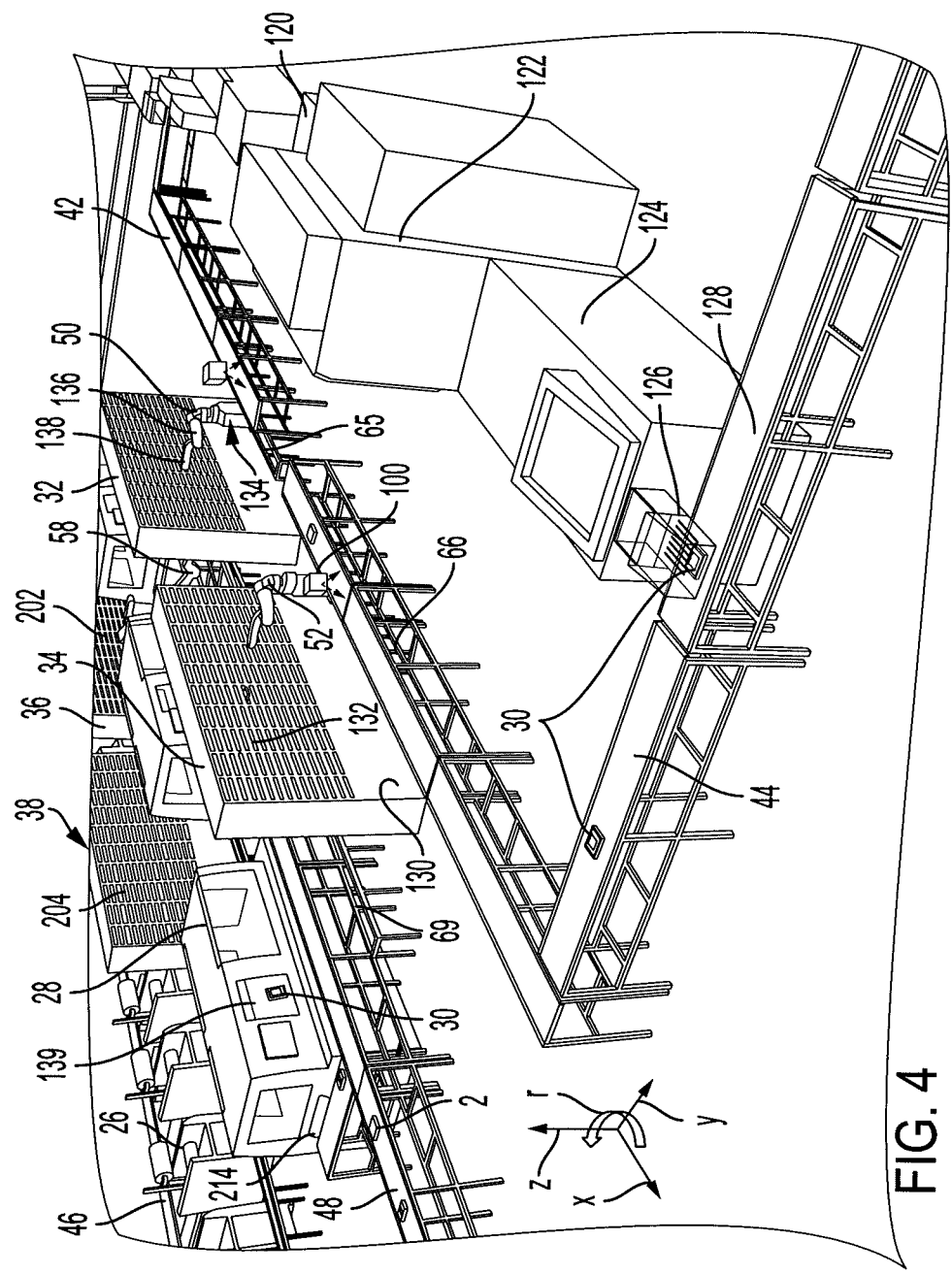
FIG. 4 is a perspective view of part of the system of FIG. 1, including a printer and multiple robots.

With reference to FIG. 4, a perspective view of part of the system 1, shows one of the color book block printers 22. Each printer includes a print media source 120, such as a tray, on the inlet side, which holds a stack of paper sheets. The sheets may be the same size for all books, since the books can be cut to size after binding. The sheets are fed singly to a marking engine 122 (or tandem marking engines), where the sheets are printed in duplex with a marking material, such as inks or toners. Each printed sheet has a page image printed on each side of the sheet, with the exception of any blank pages. In the exemplary embodiment, each sheet serves as exactly two adjacent pages of the resulting book and is not cut or folded, prior to binding. A finishing device 124, such as a collator, stacker, and/or slitter, may be positioned on the outlet side of the marking engine 122. The finishing device collates the pages in order and forms the sheets for a book block into a stack 30. In one embodiment, the finishing device 124 includes a slitter for splitting 2-up printed pages into two pages. An example 2-up slitting/collating unit 124 which may be used in-line with the book block printers is a Bourg Preparation Module (BPM), marketed by C. P. Bourg. In other embodiments, the pages are printed 1-up and no slitting is performed on the printed sheets. A drop box 126, on the outlet side of the printer releases the stack 30 of book block pages onto an adjacent conveyor belt 128 forming a part of the second transport path 44. The drop box 126 is sized and shaped to constrain the movement of the sheets, in a horizontal direction, and may have an outlet which is only slightly larger than the dimensions of a sheet.

The exemplary marking engine 122 is an electrophotographic (xerographic) marking engine, as described, for example, in U.S. Pub. No. 20100238505. Such a marking engine typically includes a charge retentive surface, such as a rotating photoreceptor in the form of a belt or drum. The images are created on a surface of the photoreceptor. Disposed at various points around the circumference of the photoreceptor are xerographic subsystems, which may include a cleaning device, a charging station for each of the colors to be applied (one in the case of a monochrome printer, four in the case of a CMYK printer), an exposure station, which forms a latent image on the photoreceptor, a developer unit, associated with each charging station for developing the latent image formed on the surface of the photoreceptor by applying a toner to obtain a toner image, a transferring unit, such as a transfer corotron, which transfers the toner image thus formed to the surface of a print media substrate, such as a sheet of paper, and a fuser, which fuses the image to the sheet with heat and/or pressure. While particular reference is made to electrophotographic printers, suitable marking engines may also include ink-jet printers, including liquid and solid ink printers, thermal head printers that are used in conjunction with heat sensitive paper, and other devices capable of marking an image on a substrate. It is to be appreciated that each of the marking engines can include an input/output interface, a memory, a marking cartridge platform, a marking driver, a function switch, a controller and a self-diagnostic unit, all of which can be interconnected by a data/control bus. Each of the marking engines in the system 1 can have a different processing speed capability.

The book block stack 30 travels along the transport path 44 between the color printer and an inlet side 130 of the set 32 of color book block buffers. A multi-axis robot 52, mounted on a horizontal track 66, transfers the stack 30 of color-containing book block pages from the transport path 44 to the inlet slot 132 of an assigned book block buffer in stack 34. Similarly, a multi-axis robot 50, mounted on a horizontal track 65, transfers each monochrome stack 30 from the transport path 42 to an inlet slot 132 of an assigned book block buffer in stack 32.

Each robot 50, 52, 54, 56, 58, 60, 62, 64 has a base 134 and an articulated arm 136, carried by the base. The base 134 is configured for movement, in an x (horizontal) direction, along a respective track 65, 66, 68, 69, etc. The tracks run parallel to the adjacent respective paths/buffer sets/binders with which the robots interact. Each track 65, 66, 68, 69 is of sufficient length to allow the arm 136 to be positioned adjacent a respective buffer and/or device, by moving the base (e.g., horizontally) to an appropriate position along the track. Each arm 136 is articulated to allow their terminal ends to move up/down in the y direction, side to side in the x direction, forward/back in the z direction, and/or rotate about one or more of the x, y and z axes, relative to the base. The arm may be jointed, along its length, to provide for each of these possible movements.

The base 134 of robot 50 is moved to a receiving position and the arm 136 is instructed to move into position to collect a stack 30 from the adjacent transport path 42. The base 134 may then be moved, if needed, along the track to a depositing position, and the arm 136 moves to lift and move the stack, then insert the stack into an appropriate inlet slot 132. The base and arm can be moved contemporaneously, to reduce the time taken in transferring the stack. Alternatively, the base and arm may be moved in separate operations. The arm 136 has an end effector 138 (the robotic equivalent of a hand) at its terminal end, which is configured to facilitate the grasping, optionally holding, and releasing operations. The base 134 and arm 136 of each robot may be similarly configured, with the end effector 138 optionally being specialized to perform its respective task. In the case of the outlet side robots 58, 60, these are configured to transfer the book block stacks 30 from respective buffers to a book block receiving receptacle 139 in a selected one of the binder 28 housings. Similarly, the outlet side robot(s) 62, 64 is/are configured to transfer the laminated cover pages from respective cover buffers to a corresponding cover receiving slot (not shown) in a selected one of the binder housings.

The buffers in each set 32, 34, 36, 38 may be arranged in an n×m array, where n is the number of buffers in each horizontal row and m is the number of buffers in each vertical column. n and m may each be at least 2 or at least 4, or at least 6. While FIG. 4 shows the book block buffers and cover buffers as having the same general size and shape, it is to be appreciated that the buffers may be of different sizes, e.g., to accommodate larger and/or wider stacks 30 or longer/wider cover pages 6.

Figure 5:
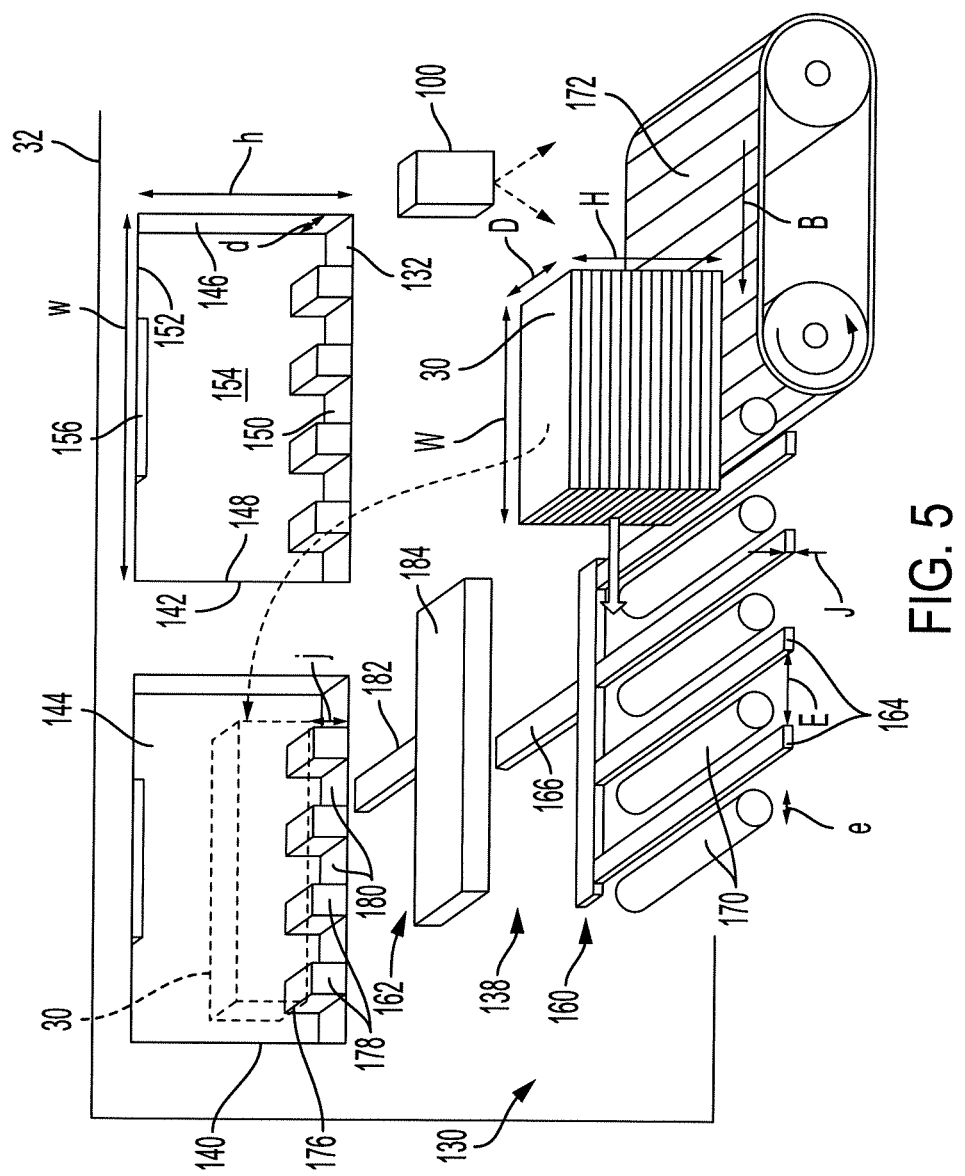
FIG. 5 is a perspective view of part of the system of FIG. 1, including buffers and a robot end effector suitable for manipulating a stack.

With reference also to FIG. 5, which shows a schematic perspective view of part of the system of FIG. 4, two book block buffers 140 and 142 are shown by way of example. Each buffer 140, 142 has a generally rectangular inlet slot 132, of dimensions w×h on the inlet side 130 and a corresponding outlet slot 144, of substantially the same dimensions, on the other side of the set of buffers, which is spaced from the inlet side 132 by a depth d. Each buffer has vertical side walls 146, 148 of dimensions d×h that are spaced by w and horizontal lower and upper walls 150, 152 spaced by h, to form an open-ended chamber 154. Each book block stack has dimensions W×D×H, where W≤w, D≤d, and H≤h. The height of the stack is variable, depending on the number of pages in the book block and their thickness. For overly large books, the stack may be split into two or more stacks, with each stack being assigned to a respective buffer 140, 142. W and D may be fixed or variable. Each book block buffer 140, 142 generally stores no more than a single stack 30 at any one time, while at any given time, some of the buffers are empty. The presence (or absence) of a stack 30 in a buffer may be detected by a sensor 156, such as an optical sensor, infrared sensor, or the like. A pair of robots 52, 56, operating in tandem on opposite sides of the set 32 of buffers 140, 142, etc., move the book block stacks/laminated sheets into and out of respective ones of the buffers.

FIG. 5 also shows an illustrative example of an end effector 136, configured for lifting and supporting a stack 30 of sheets. In this embodiment, the end effector 138 includes spaced lower and upper members 160, 162, which are movable relative to each other, to grip the stack 30. The weight of the stack is carried by the lower member 160, while the upper member 162 rests on the top of the stack to limit relative movement of the stack. The illustrated lower member is in the shape of a fork with several spaced tines 164 (four in the illustrated embodiment, although fewer or more are provided. The tines 164 extend generally in parallel from a common shaft 166. The tines are spaced from the next by a distance E. This allows the lower member 160 to be raised vertically, from below a set of parallel, spaced rotatable rollers 170 to pick up the stack 30, when it is resting thereon. The upper member 162 may then be brought down on top of the stack. The gap E is wider than the width e of a roller 170, allowing the tines 164 and rollers 170 to become interdigitated as the fork moves vertically, as shown in FIG. 5.

The rollers 170 form a part of the transport path 42. For example, a conveyor belt 172, upstream of the rollers 170, transports the stack 30 in the direction of arrow B until it is resting on the rollers 170. The rollers 170 may be driven at the same rate (e.g., by an associated motor, not shown) or simply be free to rotate. The number of rollers may be at least P−1, or at least P, where P is the number of tines 164.

The adjacent sensor 100, which may be positioned above the conveyor belt 172, detects that the stack 30 has reached the end of the conveyor belt 170 and sends a corresponding signal to the control unit 70. The control unit 70 detects the signal and instructs the robot 50 to move the lower member 160, upward, between the rollers, until the stack is resting on the tines, and directs the robot to transport the stack to an empty one of the buffers 140, 142, having received "empty" signals from buffers that are currently empty. Each buffer may include a support surface 176, defined by upper surfaces of a row of spaced, parallel blocks 178. The blocks are spaced such that each tine 164 can be received in a respective channel 180 between adjacent blocks 178. Each channel 180 is open at an upper end and may extend the depth d of the buffer between the inlet and outlet slots 132,144. The channel 180 has a height j which is slightly greater than a height J of each tine. This allows the loaded fork 160 to be lowered, after entering the buffer chamber 154, until the stack of sheets is resting on the surface 176. The lower member 160 can then be moved downward, away from the stack 30, to a position in which it can be removed from the buffer without disturbing the stack. The lower member 160 is then returned to its rest position, slightly below the tops of the rollers 170, to await the next stack. The sensor 156 reports that the buffer 140 is currently occupied (illustrated by the dashed illustration of a stack 30), so the control unit 70 will not assign a new stack to that buffer until the sensor 154 detects and reports that the buffer 140 is not occupied.

Where an upper member 162 is employed, it may include a shaft 182, which is connected to a generally planar member 184. Member 184 is positioned on an upper surface of the stack during transport by the robot. In combination, the lower and upper members serve as a gripper to sandwich the stack between them. The planar member 184 may be configured to fit within the buffer chamber 154. Alternatively, the upper member 162 may be articulated to enable it to be lifted away from the stack 30 before the stack is fitted into the buffer, in which case, the size and shape of the member 184 is not constrained by the size of the buffer. The members 160, 162 may be separately attached to the arm 136 of the robot (not show in FIG. 5) at respective articulation points and be separately controllable.

In some embodiments, each stack 30 of sheets (or some of the stacks) may be supported on a rigid plate (more rigid than the stack), which facilitates lifting of the stack by the end effector, without distortion. As will be appreciated, the end effector 138 is not limited to that described herein but can be configured in different ways.

Figure 6:
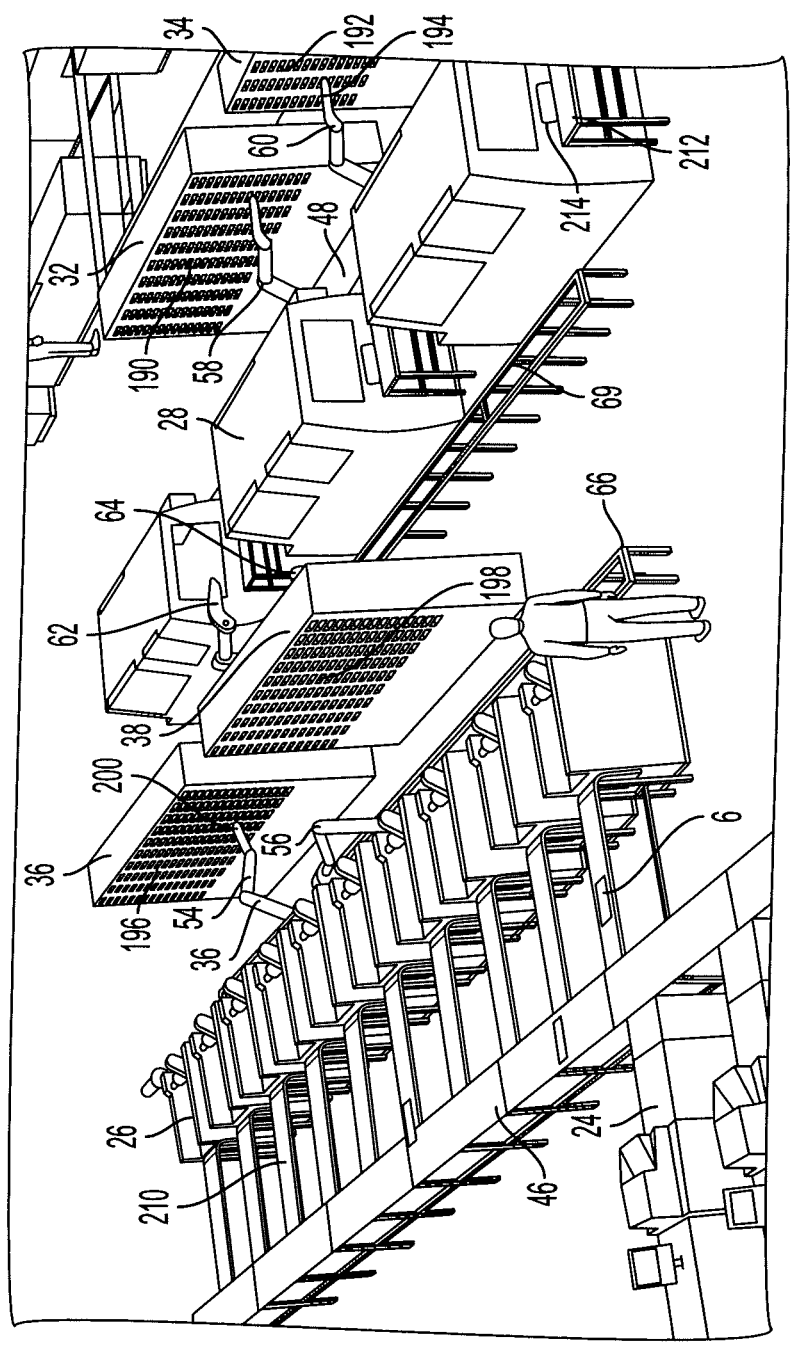
FIG. 6 is a perspective view of part of the system of FIG. 1, including a set of laminators and multiple robots.

With reference to FIG. 6, a schematic perspective view of another part the system 1 illustrates multi-axis robots 58, 60 pulling book block stacks from slots in the output sides 190, 192 of the book block buffers 32, 34 to be placed in the receiving receptacles 139 of selected binders 28. Robots 58, 60 may each be fitted with an end effector 194, analogous to the end effectors 138. Other multi-axis robots 54, 56 transport covers 6 from output sides of the laminators 26 to be placed in respective slots on the input side 196, 198 of the cover buffers 36, 38. Since these robots need only move a single cover sheet at a time, the end effectors 200 of these robots may be configured differently to end effectors 138, 194. For example, they may include grippers, suction devices, or the like. Other multi-axis robots 62, 64 pull covers 6 from slots in the output sides 202, 204 (FIG. 7) of the cover buffers 36, 38 and input them to the binders 28. As for the robots 54, 56, the robots 62, 64 may be configured to grasp or suction a single (now laminated) cover sheet.

Figure 7:
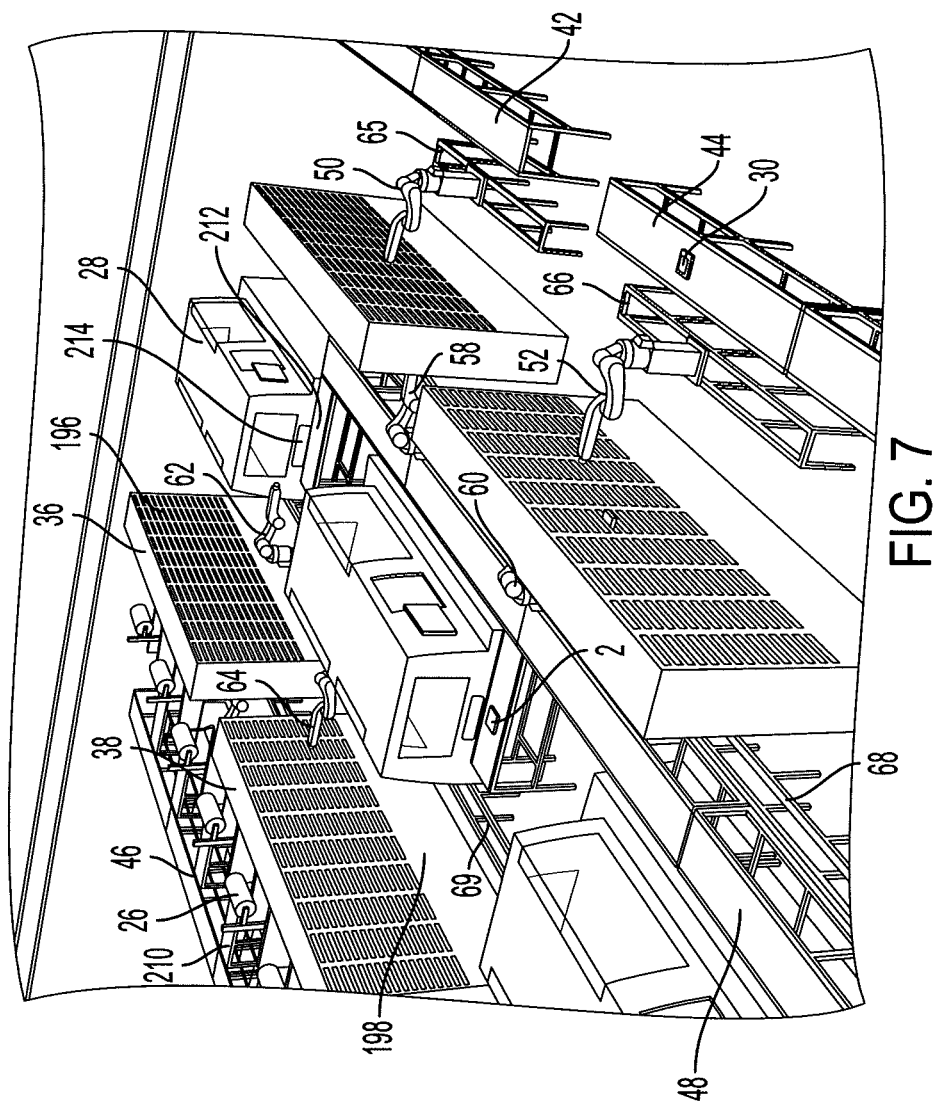
FIG. 7 is a perspective view of part of the system of FIG. 1, including a set of binders and multiple robots.
Figure 8:
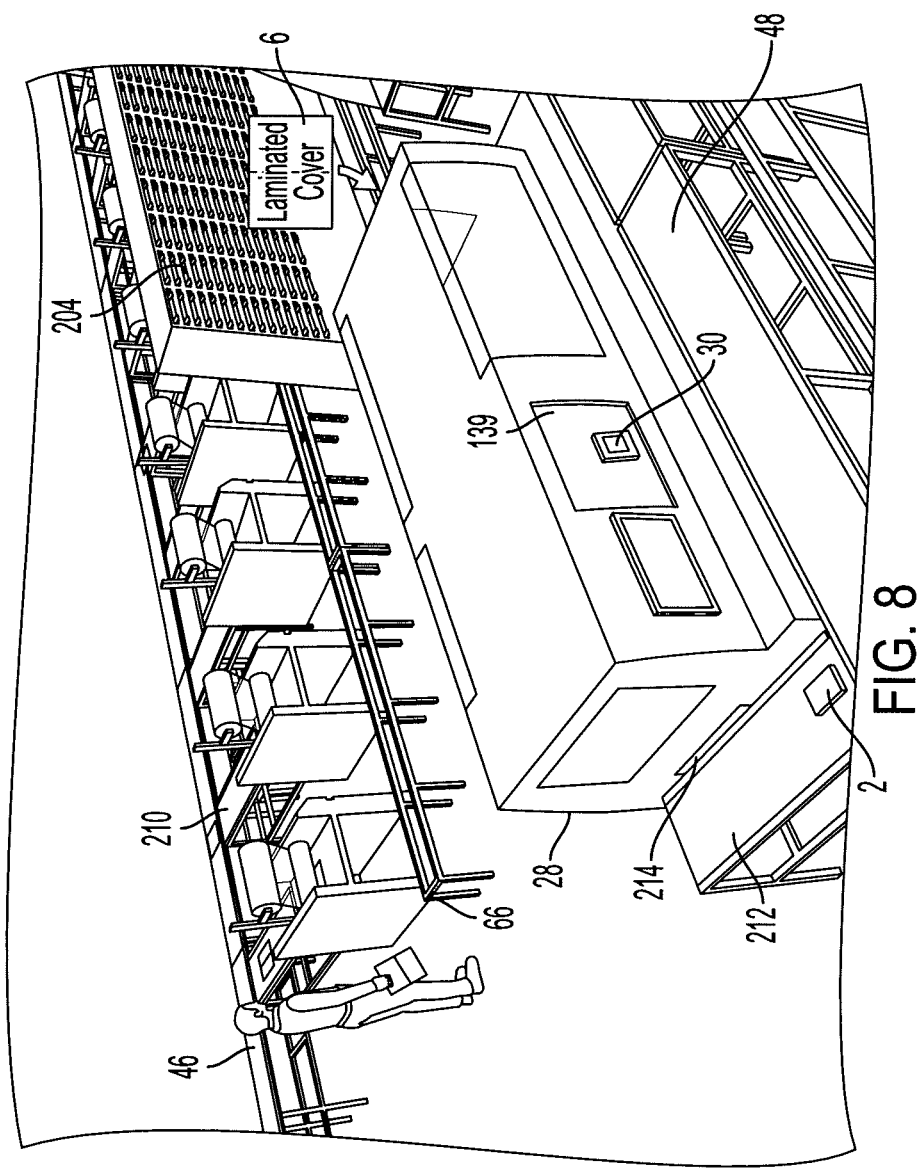
FIG. 8 is a perspective view of part of the system of FIG. 1, including a set laminators and a binder.

As also shown in FIGS. 6 and 7, the main transport path 46 carries all of the printer covers from the cover printers 24 downstream, towards the laminators. Each laminator 26 may be associated with a respective input transport member 210, such as a conveyor belt, connected with the main path 46. Each input transport member 210 carries printed cover pages 6 from the main path 46 only to that laminator for lamination. Similarly, as illustrated in FIG. 8, each of the binders 28 may be associated with a respective output transport member 212, such as a conveyor belt, which carries assembled books 2 only from an output (e.g., a slot) 214 of the respective binder 28 to the main transport path 48. The main transport path 48 then carries books from all binders. The output 214 of the binder may be at an opposite end to an input 216 (FIG. 1) which receives the laminated cover page 6.

Laminating, as used herein, includes applying a film, coating, varnish, veneer, and/or other treatments to improve the appearance, durability or scuff resistance of the cover sheet. Laminators of different types may be provided, such as those employing hot-roll lamination, extrusion lamination, flame lamination and/or adhesive lamination. Lamination may include applying a polymer sheet or extruded film to a printer cover page and optionally applying heat and/or pressure to attach the two together. In extrusion laminating, for example, a laminating adhesive, such as a low-density polyethylene, is applied to the cover page by extrusion. In another embodiment, a preformed film, such as (orientated) polypropylene (OPP), polyester, e.g., polyethylene terephthalate (PET), or Nylon film of 10-100 or 20-50 μm in thickness, is applied to the cover sheets. Lamination may be performed on one or both sides of the cover sheet. Glossy or matte laminations may be used. Exemplary laminators include Amiga™ 52 inline laminators from Komfi® (e.g., multiples of each of at least two, at least three, or at least four types of laminator, allowing for continuous/redundant throughput). In an exemplary embodiment, a plurality of each of four types of laminator (large matte, large gloss, small matte, small gloss) are provided.

The binder 28 accepts one or more printed and laminated covers 6 in a staging area and matches the printed book block to its printed cover, e.g., by comparing the machine-readable identifiers 8. Matching of the book cover to the book block occurs as a one-to-one correspondence of the printed cover to the printed book block, thereby eliminating any matching errors therebetween. Upon matching the printed cover to the printed book block, the matched components are bound together, e.g., by gluing the book block pages and cover together at the spine. Binding of the printed cover with the printed book block may be, for example, performed by in-line perfect binder such as a Vareo™, Bolero™ or Corona™ Perfect Binder manufactured by Müller Martini. The Vareo™ Perfect Binder device can employ hotmelt or Polyurethane Reactive (PUR) binding methods. In some instances, the binder may include or be connected with a trimmer unit to trim the covered bound book block. The trimming unit can be a three-knife trimmer in order to trim the three unbound edges of the covered and bound book block. "Perfect" binders incorporate such a trimmer. Other examples of three-knife trimmers include those under the tradename Challenge™ by C. P. Bourg, and Granit™ or Infinilrim™ by Müller Martini. Upon binding and optionally trimming the covered and bound book block, a completed book can be output from the book production system 1.

Figure 9:
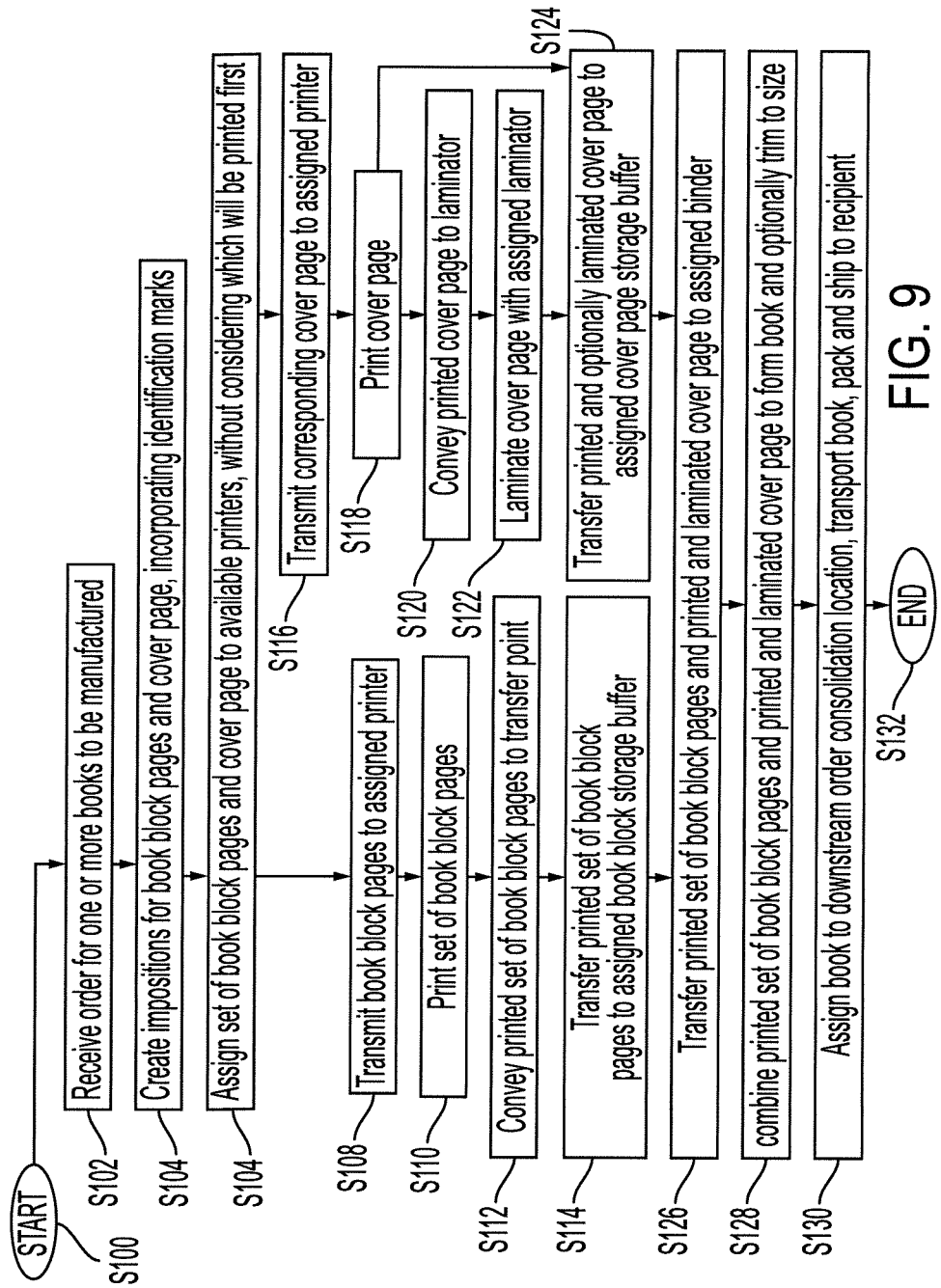
FIG. 9 illustrates a method of executing orders for books in accordance with another aspect of the exemplary embodiment.

With reference to FIG. 9 a method of fulfilling orders for books is illustrated. The method begins at S100.

At S102, an order 90 is placed by a customer (e.g., one book/many books, one title/many titles, one copy/many copies). The order is received by the order reception component 80, and temporarily stored in memory 74.

At S104, the imposition for each book block and associated cover is created by the order processing component 82. This may include applying a matching identification mark 8

(e.g., a one or two-dimensional barcode, OCR readable text, or the like) within the imposed image for the cover and one or more pages of the book block. The identification code 8 may remain on the finished book or may be trimmed during a trimming process of the book binding operation.

At S106, the book block pages and cover page for each book in the order are assigned to available ones of the sets of printers by the router 84. In one embodiment, this may include sending parts of a book to the next available printer(s). Specifically, the book block is sent to one or more of the book block printers, which may be monochrome and/or color, depending on the book's specification. The associated cover is sent to one of the cover printers.

At S108, the electronic book block pages and cover page are transmitted, electronically, to their assigned printers.

At S110, the set of book block pages, or a part thereof, is printed 1-up (or 2-up) by one or more of the first and second sets of printers 10, 12 and is collated at the exit of the respective printer, e.g., by the collator 124, which collates the pages in order. In the case of 2-up printing, a collator/slitter may be used to slit and collate the pages. When the book block is fully collated it is registered by the stacker and then dropped or placed on the indexing conveying system 40.

At S112, the book block 30 is conveyed to the transfer point on the conveyor system to be placed in a holding buffer 32, 34 to await or meet up with its cover 6. This step is performed without regard to any other books within the customer order or other concurrent orders.

At S114, the book block 30 is moved from the conveyor system to the buffer either manually, automatically or with some combination of human/machine interaction. In the illustrated embodiment, this step is performed by an automated system such as the robotic automatic sort and retrieval system (ASRS) described above.

At S116, while the set of book block pages is being printed/conveyed and buffered, the associated cover is simultaneously sent, in digital form, to be printed at any of the available cover printers 14.

At S118, the cover is printed, on the selected cover printer.

At S120, after the cover has been printed, it is placed on an indexing conveyor system 46 and transported to any one of the lamination (or coating) stations 16 as appropriate for the type and size of lamination and availability.

At S122, the printed cover is laminated. If lamination is to be omitted for a given book, steps S120 and S122 can be omitted.

At S124, the completed laminated cover is then transferred to one of the cover buffers using a similar ASRS system.

At S126, when the cover and associated book block are both identified as available for binding (S114 and S124 are complete), the cover and associated book block are conveyed (via robotics or human interaction or both) to a designated available binding system.

At S128, the book block and cover are combined, bound and optionally trimmed to complete the final book product.

The entire bookmaking process may be completed without regard to any of the other books being produced. No batching is required and no excess wait time or work-in-progress is introduced while producing each book.

At S130, the book may be allocated or assigned to a downstream location or sorting operation for any order consolidation or shipping. For example, the book is packaged with other books/items in the order, if any, and shipped to the recipient.

The method ends at S132.

The control parts of the method illustrated in FIG. 9 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the control unit 70 (for example, an internal hard drive of RAM), or may be separate (for example, an external hard drive operatively connected with the control unit 70), or may be separate and accessed via a digital data network such as a local area network (LAN) or the Internet (for example, as a redundant array of inexpensive or independent disks (RAID) or other network server storage that is indirectly accessed by the control unit 70, via a digital network).

Alternatively, the method may be at least partially implemented in transitory media, such as a transmittable carrier wave in which the control program is embodied as a data signal using transmission media, such as acoustic or light waves, such as those generated during radio wave and infrared data communications, and the like.

The control parts of the exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing a part of the flowchart shown in FIG. 9, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

All of the processes within the exemplary Make-On-Demand bookmaking method described herein are assigned based on availability. This means that if a system such as a printer, laminator, book binder, etc. is down for maintenance or functional issue, the jobs are automatically routed directly to the next available printer. This maximizes redundancy because each system is independent of the following process and independent of number or types of books in any order.

Additionally, to improve job recovery, any books sent to a system 1 or component device thereof that subsequently suffers a fault may be rerouted to another available system or device to execute that part of the process. The books involved in the device failure can then be identified and any associated parts such as the cover may be removed from the system or matched with the new parts, such as a new book block.

The exemplary system acts like a parallel processing computing systems by allocating "jobs" to any available system to process multiple books in a parallel manner rather than using batches that require multiple books to be processed before any of the individual (book of one) books can be processed. This reduces the tact times (time for any sub assembly process within the overall process) creating a balanced line that has shorter throughput times and eliminates bottlenecks within the system due to mismatched processing times.

These improvements lead directly to the ability of online book retailers to print and deliver a book in a shorter period of time.

Some other improvements of the exemplary system and method are as follows.

The exemplary method eliminates printing to batch (waiting for last book before further processing first book). The parallel printers can process all or at least some books within a job simultaneously across multiple printers.

The exemplary system allows each printer to feed into the conveyor system independently, allowing for routing jobs among printers.

The exemplary system allows printing of covers simultaneously with book block printing.

The 7 axis robotic linear sorting and retrieval systems (robots) facilitate the automatic book block and cover buffering. The use of custom robots and buffer systems for both book blocks and covers allows balancing printing/processing times that smooth out differences in production process tact times.

The system allows for robotic or manual human interaction as options for differing levels of automation.

The system allows for multiple independent cover printers to feed to multiple laminators as part of automated highly parallel processing of book workflow.

The system allows for several lamination types to be fed by any cover printer output and allows for several printers to feed into any lamination type.

Matching book and cover identifiers facilitate sorting/buffering and retrieval.

The use of One-Up printing rather than Two-Up or more eliminates batching and bottlenecks that could occur at a conventional guillotine cutting system.

The system eliminates errors associated with manual guillotine cutting and batching.

The system eliminates the need to cut sheets at each printer prior to forming a book block stack.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A bookmaking system comprising:
   a set of redundant cover printers, each of the redundant cover printers in the set being configured to print a cover page for a respective book;
   a set of redundant book block printers, each of the redundant book block printers in the set being configured for printing a corresponding set of pages for a book block of a respective book;
   a binder which binds a printed cover page, printed by any one of the set of redundant cover printers, and a corresponding set of printed pages for a book block, printed by any one of the set of redundant book block printers, together to form a book;
   a plurality of book block buffers, intermediate the book block printers and the binders, each of the book block buffers configured for storing a respective set of printed pages for only a respective one of the book blocks until the corresponding printed cover page is ready for binding; and
   a transport mechanism connecting each of the set of redundant printers and each of the set of redundant cover printers with the binder, the transport mechanism transporting the set of pages for a book block in the form of a stack of pages, the transport mechanism including a transport path which includes spaced rollers and a first robot with an end effector shaped to support the entire stack while transferring the stack into one of the book block buffers, wherein the end effector includes a set of tines which are spaced and shaped to be interdigitated between the rollers of the transport path and wherein the book block buffers each include a row of spaced, parallel blocks which receive the tines of the end effector between them.

2. The bookmaking system of claim 1, wherein the set of book block printers includes a set of color printers and a set of monochrome printers, each of the printers in the sets of printers being connected with the transport mechanism.

3. The bookmaking system of claim 1, wherein the book block printers each print book block pages 1-up, such that the printed book block pages are not cut between printing and binding.

4. The bookmaking system of claim 1, wherein the binder includes a plurality of redundant binders.

5. The bookmaking system of claim 1, further comprising a plurality of laminators, intermediate the cover page printers and the binder, each of the laminators being connected, by the transport mechanism, with each of at least a plurality of the cover page printers in the set of cover page printers.

6. The bookmaking system of claim 5, wherein each of the plurality of laminators is connected, by the transport mechanism, with the binder.

7. The bookmaking system of claim 6, wherein the transport mechanism includes at least one of:
   a third robot, which transports a printed cover page for a book between one of the laminators and one of the plurality of cover buffers; and
   a fourth robot, which transports a printed cover page for a book between one of the plurality of cover buffers and the binder.

8. The bookmaking system of claim 1, further comprising a router which identifies an available one of the set of book block printers for printing the set of pages for the book block, an available one of the set of cover printers for printing the cover for the book, and optionally an available laminator from a set of laminators for laminating the cover page, which enables printing of covers simultaneously with book block printing.

9. The bookmaking system of claim 8, wherein the router identifies an available one of the set of cover printers without considering when the set of book block pages will be printed.

10. The bookmaking system of claim 8, further comprising an order processing component which incorporates matching machine readable identifiers in at least one of the set of book block pages and the cover page in electronic form.

11. The bookmaking system of claim 1, further comprising a control unit and sensors, associated with the transport mechanism, the sensors detecting machine readable identifiers printed on the cover page and at least one of the corresponding set of book block pages and sending respective signals to the control unit.

12. The bookmaking system of claim 1, wherein the book block buffers each include an inlet slot, which is sized to receive a stack of pages for a book block from a first robot of the transport mechanism, and an outlet slot, spaced from the inlet slot, which is sized to furnish the stack of printed pages to a second robot of the transport mechanism, the book block buffers each including a support surface defined by upper surfaces of a row of spaced, parallel blocks.

13. The bookmaking system of claim 1, wherein the book block buffers are arranged in an array, such that an inlet side of the book block buffers is accessible to a first set of robots, including the first robot, and an outlet side of the book block buffers is accessible to a second set of robots.

14. The bookmaking system of claim 1, wherein the book block buffers include a first set of redundant book block buffers which are each configured to receive a stack of printed monochrome pages for a book block and a second set of redundant book block buffers which are each configured to receive a stack of printed color pages for a book block.

15. A bookmaking method comprising:
providing a set of redundant book block buffers, a set of redundant cover buffers, and for each of the redundant book block buffers, a sensor which reports whether the book block buffer is currently occupied;
receiving an order for at least one book;
for each book in the order,
assigning printing of a cover of the book to an available one of a set of redundant cover printers;
assigning printing of a set of pages for a book block of the book to an available one of a set of redundant book block printers;
printing the set of pages to form the book block of the book on the available one of the set of redundant book block printers;
with a control unit, identifying an unoccupied one of the plurality of book block buffers from a report from one of the sensors;
providing a first transport path for transporting the set of printed pages to the unoccupied one of the plurality of redundant book block buffers;
printing the cover of the book on the available one of the set of redundant cover printers, without reference to whether the set of pages to form the book block have been printed;
transporting the printed cover to an available one of a set of redundant laminators;
laminating the printed cover with the available one of the set of redundant laminators;
providing a second transport path for transporting the laminated printed cover to an unoccupied one of the set of redundant cover buffers;
storing at least one of the laminated printed cover and the set of printed pages for the book block in a respective storage buffer of the sets of redundant cover and book block storage buffers;
when the laminated printed cover page and the printed pages for the book block are ready for binding and one of a set of redundant binders is available for binding, retrieving the stored at least one of the laminated printed cover page and the set of printed pages from the respective storage buffer; and
binding the laminated printed cover page and the set of printed pages for the book block, together to form a book.

16. The bookmaking method of claim 15, wherein the order includes a plurality of books and wherein the assigning of the cover pages and sets of book block pages for the books is performed contemporaneously.

17. The bookmaking method of claim 15, wherein the set of book block printers are each configured for printing a set of pages for a book block 1-up and the method includes binding each set of printed pages for a book block into a book without trimming the printed pages before binding.

18. The bookmaking method of claim 15, comprising providing a transport mechanism includes a plurality of transport paths for conveying sets of printed book block pages and printed cover pages and a plurality of robots for transferring the conveyed printed book block pages and printed cover pages to respective storage buffers and a plurality of robots for transferring the conveyed printed book block pages and printed cover pages from the respective storage buffers to the binder.

19. The bookmaking method of claim 15, further comprising tracking the set of printed pages for the book block and printed cover page with sensors as they are transported between respective printers and the binder, based on printed machine readable identifiers.

* * * * *